UNITED STATES PATENT OFFICE.

CARLETON ELLIS AND VERNON T. STEWART, OF MONTCLAIR, NEW JERSEY.

MANUFACTURE OF ARSENIC ACID.

1,415,323.  Specification of Letters Patent.  Patented May 9, 1922.

No Drawing.  Application filed May 21, 1921. Serial No. 471,436.

*To all whom it may concern:*

Be it known that we, CARLETON ELLIS and VERNON T. STEWART, citizens of the United States, and residents of Montclair, in the county of Essex and State of New Jersey, have invented certain new and useful Improvements in the Manufacture of Arsenic Acid, of which the following is a specification.

This invention relates to a process of making arsenic acid and particularly arsenic acid slightly diluted with water so that it may be handled as a concentrated liquid and relates particularly to the treatment of white arsenic, that is arsenic trioxide, with chlorine in the presence of water to form arsenic acid and hydrochloric acid.

It has heretofore been proposed to treat white arsenic in suspension in water with chlorine in connection with the preparation of arsenic pentoxide. In the present invention arsenic trioxide is treated with chlorine in the presence of water but preferably the operation is carried out with a solution of the trioxide rather than as a suspension. The action of chlorine on a suspension of trioxide does not secure the same contact and effective reaction as where a solution is employed.

The manufacture of arsenic acid for the production of arsenicals such as arsenate of lead or arsenate of lime used as insecticides calls for arsenic acid of a high degree of purity especially as concerns the content of lower oxides. It is important therefore in preparing arsenic acid for this purpose to secure effective oxidation of white arsenic. The method hereinafter set forth involving the treatment of a solution of white arsenic with chlorine aims to yield a product of a purity requisite for the manufacture of insecticides such as those mentioned above.

In the present invention preferably only such a quantity of water is present as will enter into combination with arsenic pentoxide as produced yielding arsenic acid and with just enough additional water to keep the acid in liquid form. For that purpose about 25% of water is desirably present although the amount may vary somewhat according to climate etc. For shipping in liquid form a minimum amount of water, consistent with handling the product in steel drums or tank cars, is desirable to minimize shipping charges. It is also desirable to have hydrochloric acid removed to a very large degree from the arsenic acid in order to avoid difficulties from corrosion of iron containers. Apart from the damage due to such corrosion on the containers themselves there is the objection that the arsenic acid is discolored and the arsenate of lime or lead made therefrom will be "off color."

The present invention also involves the fairly complete removal or entire elimiation in some cases of the hydrochloric acid. In the preparation of arsenate of lead the presence of chlorides is considered objectionable because of the tendency to form a double salt, namely, lead chlorarsenate. This is more stable than the dilead arsenate and is therefore considered less poisonous than the latter. On the other hand the presence of calcium chloride in calcium arsenate in small amounts at least is not ordinarily objectionable and in fact may be beneficial in dry climates in attracting moisture to vegetation coated with such arsenical thereby aiding in securing better adherence to the leaf or stalk. However for various reasons it is desirable to have the hydrochloric acid, in liquid concentrated arsenic acid, below 1%. The removal of hydrochloric acid and more especially the last few per cent is difficult as the arsenic acid retains the last portion of the hydrochloric acid rather tenaciously. In the present invention a method is disclosed of cheaply reducing the hydrochloric acid below an objectionable content.

In carrying out the invention in its preferred form a lesser quantity of water is used than white arsenic. The latter may be the ordinary commercial grade of white arsenic but preferably should contain 95% or more of arsenic trioxide. On mixing equal volumes of white arsenic and water a liquid product is obtained through which chlorine bubbles readily. This mixture or preferably one containing a slightly less amount of water is treated with chlorine either in the cold or in heated condition. Preferably the water employed is hot and the white arsenic admixed therewith then treated with chlorine, preferably with agitation. Although the latter is not necessary especially if the chlorine be introduced through suitable distributing means. The reaction starts in the cold but is accelerated by an increase in temperature hence the preference for using hot water at the start. After the chlorine has been passed into the mixture for a short time complete solution of the arsenic trioxide occurs and the chlorine is then allowed to react on this solution over a period of one to three hours, depending upon the rate at which the chlorine is introduced, the degree of agitation if any, the temperature and similar conditions. By proportioning the amount of water to the white arsenic so as to quickly secure a solution of this character, thereby allowing the chlorine to react on a solution of the white arsenic rather than a suspension thereof, a desirably effective degree of oxidation is secured with elimination of hydrochloric acid while still maintaining the concentration of the reaction mass such that no evaporation is required for the product in order to yield syrupy or concentrated arsenic acid of proper shipping strength.

During the early stages of the reaction the hydrochloric acid formed dissolves in the water and the aqueous hydrochloric acid thus produced may be regarded as the medium from which the arsenic pentoxide derives water to form arsenic acid. As the content of water diminishes due to the formation of arsenic acid hydrochloric acid is expelled until at the close of the operation when approximately 25% more or less of water is present the major portion of the hydrochloric acid has been eliminated. The latter is suitably collected in water or other absorbing agent to be utilized for commercial purposes. The concentrated arsenic acid solution is finally preferably subjected to a special treatment for the removal of the residue of hydrochloric acid or at least enough of it to reduce the content of hydrochloric acid preferably to less than 1%. For this purpose we pass air through the hot concentrated arsenic acid solution, the air if desired being preheated and the temperature of the arsenic acid being maintained at between 80 and 100° C. The current of air carries away residual hydrochloric acid quite rapidly so that in a short space of time the arsenic acid is completely finished and ready for shipment. The action takes place in shallow layers more rapidly than in deep ones and preferably shallow tanks should be used for the air blowing treatment. The air may be passed through water or other absorptive medium to collect hydrochloric acid. Preferably the temperature is kept below the point at which arsenic acid is carried away from the acid concentrate. Also it is desirable to avoid too rapid passage of the air in order that arsenic acid may not be entrained. The air current may however pass through a filter or set of screens to remove entrained arsenic acid.

Also it is possible to use superheated steam by itself or admixed with air to serve for or assist in the removal of residual hydrochloric acid. However air alone serves admirably for the purpose and the operation is simple and cheap to carry out and is readily controlled; care being had especially not to allow the temperature to rise to a point at which any material portion of the arsenic acid is carried off in the vaporized state by the air current. In the air blowing operation the tank may be heated externally and as stated the air also may be preheated. If cold air is used it is necessary or preferable to maintain a stronger heating means under or around the receptacle used for the air blowing operation.

The reaction taking place when white arsenic dissolved as aforesaid comes in contact with chlorine involves the development of a very considerable amount of heat and the reaction takes place much more rapidly hot than cold. By using a tank of large dimensions so that radiation losses are relatively small the temperature may rise too rapidly and too vigorous ebullition occur. While this may be regulated by slowing down the chlorine stream such operation retards the completion of the reaction, and in cases where such excess of heat is present it is desirable to have cooling coils to suitably modify the temperature. On the other hand toward the close of the reaction when the content of arsenic trioxide is low the reaction becomes more sluggish and it may then be necessary to apply external heat or by passing steam through the coils previously used for cooling purposes. This temperature control will vary with the type and size of apparatus employed. If carried out in a tall tower exposing considerable surface to radiation the heat of reaction does not become so manifest.

By the foregoing process it will be noted that while white arsenic is the raw material it is allowed to react not as such but in the form of arsenious acid in solution. In the foregoing therefore where white arsenic has been referred to it should be understood that we mean more specifically arsenious acid where a solution undergoing reaction is described. It is probable that by so proportioning our reaction mixture as to enable the rapid and in fact almost immediate conversion of white arsenic into arsenic acid the reaction is effected under as nearly ideal conditions for the formation of arsenic acid as can be established.

A specific example of the process is as follows: 198 parts by weight of dry white arsenic of 98.7% purity with 185 parts by weight of water were mixed and treated with a stream of chlorine in the cold without mechanical agitation. The reaction was allowed to go on in a receptacle taller than its diameter so as to secure more protracted contact of the chlorine gas. After 10 or 15 minutes passage of the chlorine the solution was clear due no doubt to the complete formation of arsenious acid from the white arsenic, together with the simultaneous formation of some arsenic and hydrochloric acids. This solution was further treated with chlorine for a period of between 2 and 3 hours. The hydrochloric acid evolved was collected in absorbers. The crude arsenic acid was still charged with hydrochloric acid and the liquid was placed in a shallow receptacle, heated to between 80 and 90° and preheated air blown through until the content of hydrochloric acid was reduced to .42%. The hydrochloric acid obtained from this treatment was likewise absorbed. The arsenic acid thus obtained had a strength of 77.5%.

In like manner by proportioning the amount of water more concentrated arsenic acid or even the solid form of arsenic acid may be obtained. In other words the process offers the means of producing arsenic acid of any suitable degree of hydration or dehydration but preferably as a product containing about 25% of water and substantially free from hydrochloric acid.

In carrying out this method of oxidation by chlorine it must further be borne in mind that the arsenic acid should be so completely oxidized, at least when used for manufacture of insecticides, that no appreciable or substantial amounts of lower oxides of arsenic are present or bodies which will form soluble compounds of lead or lime such as to cause destruction of foliage by so called "burning".

The treatment with chlorine according to the foregoing process enables arsenic acid of a high grade of purity free from any objectionable quantities of compounds forming soluble substances under these conditions. The reaction of chlorine under the circumstances described is not only rapid and vigorous but may be carried practically to a quantitative end point.

In view of the foregoing it is thus possible to effectively use ordinary chlorine gas such as is obtained from an electrolytic cell and which oftentimes contains 20% or so of air and sometimes other gases. The dilution or contamination of the chlorine does not effect the carrying out of the present reaction in a definite and controllable manner.

While in the foregoing the amount of water used has been proportioned preferably to give approximately the precise strength of arsenic acid required as a finished product which was specifically a concentrated acid for shipping purposes it is also possible to work with somewhat more dilute solutions of arsenious acid and then to concentrate by boiling to get the requisite strength of acid. By carrying out this boiling operation hydrochloric acid is very largely removed but a finishing treatment with air blowing is usually desirable. For example using chlorine from electrolytic cells containing about 80 or 85% actual chlorine and an aqueous solution of arsenious acid capable of yielding on complete oxidation a 60% strength arsenic acid, evaporation to 75% strength will eliminate a large portion of the hydrochloric acid and if necessary residual hydrochloric acid may be driven off by heating and blowing with air or other suitable gaseous medium. The present invention is not limited to any precise strength of acid and in fact may be employed for making arsenic acid at the point of consumption. For example in the production of arsenate of lead or lime. The hydrochloric acid obtained from the foregoing is preferably absorbed in water to make hydrochloric acid of usual commercial strength. The present invention involves in one phase at least not only the production of concentrated arsenic acid but also of hydrochloric acid in aqueous form of usual commercial strength. The process is especially adapted for yielding arsenic acid free from unoxidized impurities giving objectionable by-products in the manufacture of arsenate of lead or lime.

What we claim is:—

1. The process of making arsenic acid which comprises treating a concentrated solution of a lower oxide of arsenic with chlorine and in eliminating hydrochloric acid therefrom.

2. The process of making arsenic acid which comprises reacting on a mixture of white arsenic and a slightly lesser amount of water with chlorine gas, in forming a solution of the white arsenic and in continuing the introduction of chlorine to completely oxidize the material to arsenic acid.

3. The process of making arsenic acid and hydrochloric acid which comprises reacting on a mixture of white arsenic and water the proportion of the latter being less than the former with a rapid current of chlorine gas containing air and allowing the reaction material to rise in temperature while continuing the introduction of chlorine to bring about complete oxidation to arsenic acid.

4. The process of making arsenic acid and hydrochloric acid which comprises reacting on a mixture of white arsenic and water in approximately equal proportions with a rapid current of chlorine gas containing air and allowing the reaction material to rise in temperature while continuing the introduction of chlorine to bring about complete oxidation to arsenic acid.

5. The process of producing arsenic acid and hydrochloric acid as separate products by treating a concentrated solution of a lower oxide of arsenic with chlorine and separating the contained hydrochloric acid by blowing through the solution a gas which does not enter into the reaction.

6. The process which comprises chlorinating a concentrated solution of arsenious acid to completely convert to arsenic acid and in substantially eliminating hydrochloric acid therefrom while maintaining the reaction material in a liquid state throughout the entire operation.

7. The process which comprises reacting on disolved arsenious acid in aqueous solution with chlorine gas of approximately 80% purity to completely convert the arsenious acid to arsenic acid and form hydrochloric acid, in collecting and absorbing the hydrochloric acid whereby both concentrated arsenic and hydrochloric acids are separately obtained.

8. The process of making concentrated arsenic acid and concentrated hydrochloric acid which comprises reacting on a hot concentrated aqueous solution of arsenious acid with chlorine gas to form concentrated arsenic acid substantially free from arsenious acid and concentrated hydrochloric acid and separating the arsenic acid substantially from the hydrochloric acid.

9. The process which comprises chlorinating a concentrated solution of arsenious acid to substantially completely convert to arsenic acid and in substantially eliminating hydrochloric acid therefrom; the proportion of water present being such that arsenic acid of approximately 75% strength is obtained.

10. The process of making a liquid concentrate of arsenic acid which comprises incorporating white arsenic and water, introducing chlorine gas and continuing the treatment with the gas to substantially completely convert the white arsenic into arsenic acid and removing a portion at least of the hydrochloric acid; the proportion of water present being such that liquid concentrated arsenic acid is obtained.

CARLETON ELLIS.
VERNON T. STEWART.